US012756334B2

(12) United States Patent
Nannen et al.

(10) Patent No.: US 12,756,334 B2
(45) Date of Patent: Oct. 6, 2026

(54) METHOD FOR OPERATING AN ELECTRIC DRIVE DEVICE

(71) Applicant: Siemens Aktiengesellschaft, Munich (DE)

(72) Inventors: Hauke Nannen, Nuremberg (DE); Thomas List, Sulzbach-Rosenberg (DE); Dominic Malane, Eichstätt (DE)

(73) Assignee: Siemens Aktiengesellschaft, Munich (DE)

( * ) Notice: Subject to any disclaimer, the term of this patent is extended or adjusted under 35 U.S.C. 154(b) by 160 days.

(21) Appl. No.: 18/855,364

(22) PCT Filed: Feb. 20, 2023

(86) PCT No.: PCT/EP2023/054190

§ 371 (c)(1),
(2) Date: Oct. 9, 2024

(87) PCT Pub. No.: WO2023/198341

PCT Pub. Date: Oct. 19, 2023

(65) Prior Publication Data

US 2025/0239948 A1 Jul. 24, 2025

(30) Foreign Application Priority Data

Apr. 11, 2022 (DE) ..................... 10 2022 203 609.3

(51) Int. Cl.
*H02K 7/102* (2006.01)
*H02P 1/04* (2006.01)
*H02P 3/18* (2006.01)

(52) U.S. Cl.
CPC ............... *H02P 1/04* (2013.01); *H02K 7/102* (2013.01); *H02P 3/18* (2013.01)

(58) Field of Classification Search
CPC ............... F16D 63/006; F16D 2121/14; F16D 2121/22; H02P 1/04; H02P 3/18; H02K 7/102
(Continued)

(56) References Cited

U.S. PATENT DOCUMENTS 5,294,875 A * 3/1994 Reddy .................... H02K 11/33 310/179
7,453,220 B2 11/2008 Becker et al.
(Continued)

FOREIGN PATENT DOCUMENTS

DE 10324664 A1 12/2004
DE 102004013033 B3 * 7/2005 ................ H02P 3/04
(Continued)

*Primary Examiner* — Maged M Almawri
(74) *Attorney, Agent, or Firm* — Laurence A. Greenberg; Werner H. Stemer; Ralph E. Locher

(57) ABSTRACT

A method operates an electric drive device having a voltage supply with phase conductors providing multiphase supply voltage, a multiphase electric motor connected to the phase conductors, an electrically actuatable brake acting on the motor and switching between a position blocking the motor in a voltage-free state and an open position releasing the motor in a voltage-supplied state, the brake being solely connected to a subset of the phase conductors, the brake requiring a defined opening period until reaching the open position after switching from voltage-free to voltage-supplied states, and switches independently interrupting the phase conductors. In a starting state, the phase conductors are interrupted. Based on the starting state, only the subset of phase conductors connected to the brake are switched to conduct a current, and after a defined waiting period, the motor is activated by switching remaining phase conductors to conduct a current.

10 Claims, 5 Drawing Sheets

(58) Field of Classification Search
USPC .......................................................... 310/77
See application file for complete search history.

(56) References Cited

U.S. PATENT DOCUMENTS

| | | | | |
|---|---|---|---|---|
| 8,237,385 | B2 * | 8/2012 | Street | H02P 6/18 318/400.1 |
| 9,602,029 | B2 * | 3/2017 | Schwarzkopf | H02M 7/5395 |
| 11,108,292 | B2 * | 8/2021 | Koenig | H02P 6/08 |
| 11,881,800 | B2 | 1/2024 | Ido et al. | |
| 2004/0041530 | A1 * | 3/2004 | Peterson | H02P 1/18 318/400.01 |
| 2007/0114861 | A1 | 5/2007 | Bott et al. | |
| 2010/0066287 | A1 * | 3/2010 | Street | H02P 6/18 318/400.34 |
| 2014/0062371 | A1 * | 3/2014 | Schultz | B60L 3/0061 318/471 |
| 2017/0310256 | A1 * | 10/2017 | Zheng | H02P 6/185 |
| 2020/0136454 | A1 * | 4/2020 | Koenig | H02K 3/28 |
| 2025/0364939 | A1 * | 11/2025 | Jang | H02P 29/0243 |
| 2026/0095113 | A1 * | 4/2026 | Nishimura | H02P 3/22 |

FOREIGN PATENT DOCUMENTS

| | | | | |
|---|---|---|---|---|
| DE | 102009007797 | A1 | 8/2010 | |
| EP | 1612925 | A2 * | 1/2006 | H02P 6/15 |
| EP | 2144345 | A1 * | 1/2010 | B60L 15/007 |
| GB | 2441570 | A | 3/2008 | |
| SU | 1234938 | A1 * | 5/1986 | |
| WO | WO 2021100397 | A1 | 5/2021 | |

* cited by examiner

METHOD FOR OPERATING AN ELECTRIC DRIVE DEVICE

FIELD AND BACKGROUND OF THE INVENTION

Summary of the Invention

The present invention relates to a method and a control unit for operating an electric drive device.

In drive technology applications such as conveyor technology, for example, a drive motor can be mechanically locked by an electromagnetic quiescent current brake when a voltage supply is interrupted. DE 103 24 664 A1 (Siemens AG) Dec. 30 2004 describes such a brake 60 formed as a spring pressure brake: If there is no operating voltage at the brake, an axially movable friction disc 602 of the brake 60 is pressed by a pressure spring against a friction surface 603 that is connected to the motor in a rotationally fixed manner, with the result that the motor is braked or held securely. By applying the brake operating voltage, an electromagnet 604 of the brake 60 is activated, with the result that the friction disc 602 is pulled away from the friction surface 603 and the motor is released.

To avoid the outlay for a separate voltage supply to the brake, in many cases the brake is simply attached to the voltage supply of the motor. If an operating voltage is now applied to the motor, and therefore also to the brake, the motor draws a high current but is initially still mechanically locked by the brake: after the voltage is applied, first a period of 50 ms to 150 ms passes until the brake has released to the extent that the motor can begin its ramp-up. In this period in which the motor is in fact supplied with current, but cannot yet turn on account of the locking by the brake, high losses occur in the motor which heat it up un-necessarily.

Up until now, these losses have been accepted. The motor is over-dimensioned in such a way that it nevertheless produces the required performance in the respective application, although there is an increased load at the start due to the brake.

It is therefore an object of the present invention to improve the operation of an electric drive device.

This object is achieved by a method having the features described below. The object is also achieved by a control unit having the features described below.

The method is used to operate an electric drive device. The electric drive device here has a voltage supply, which has two or more phase conductors for providing a multiphase supply voltage. The phase conductors are referred to hereinafter also as motor phases or simply as phases. The electric drive device here also has a multiphase electric motor, which is connected to the two or more phase conductors. The electric drive device here also has an electrically actuatable brake for acting upon the electric motor, which brake can be switched between a braking position that locks the electric motor in a voltage-free state and an open position that releases the electric motor in a voltage-supplied state. The brake here is connected to only a subset of the two or more phase conductors. After the switching from the voltage-free state into the voltage-supplied state, the brake also requires a defined opening period until the brake has reached the open position. The brake, which can be formed as a spring pressure brake, is also referred to hereinafter as a motor brake. The electric drive device also has a number of switches that corresponds to the number of phase conductors, which switches can be used to switch each of the two or more phase conductors to be current-conducting or current-blocking independently of the other phase conductors. The switches here can be formed as mechanical switches and/or as semiconductor switches. The method has a first step in which an initial state is produced in which the two or more phase conductors of the voltage supply are interrupted. The method has a second step in which, starting from the initial state, only the subset of the phase conductors to which the brake is connected are switched to current-conducting. The method has a second step in which, after a defined waiting period has elapsed, the electric motor is activated by virtue of the remaining phase conductors also being switched to current-conducting.

The control unit is used to operate an electric drive device. The control unit is configured to transmit a current-blocking switching command to two or more switches which are actuatable independently of one another and by means of which in each case one phase conductor of a voltage supply for providing a multiphase supply voltage to an electric motor can be interrupted. By means of this current-blocking switching command, an initial state can be produced in which the two or more phase conductors of the voltage supply to the electric motor are interrupted. The control unit is also configured, starting from the initial state, to transmit a first current-conducting switching command to the switch or switches which switch a subset of the phase conductors to which an electrically actuatable brake for acting upon the electric motor is connected. By means of the first current-conducting switching command, a change of the brake from a voltage-free state, in which it adopts a braking position that locks the electric, into a voltage-supplied state is caused. As soon as the brake is supplied with voltage, after a defined opening period has elapsed, it moves into an open position that releases the electric motor. The control unit is also configured, after a defined waiting period has elapsed after the first current-conducting switching command, to transmit a second current-conducting switching command to the switch or switches which switch the remaining phase conductors. By means of the second current-conducting switching command, the remaining phase conductors are also switched to current-conducting and the electric motor is activated.

The invention is based on the realization that, in the event of an electric motor and a brake that acts upon the electric motor being electrically powered by the same phase conductors, the thermal losses in the electric motor, which arise after the simultaneous activation of the voltage supply to electric motor and brake until the brake is completely released, can be minimized by the brake being activated before the electric motor. For this purpose, first only the phase conductor or phase conductors which are used to supply voltage to the brake are switched to current-conducting. Therefore, a change of the brake from the braking position into the open position can already begin, before the rest of the phase conductors, at a later point in time after a defined waiting period has elapsed, are also switched to current-conducting and the electric motor moves into a voltage-supplied state in which the electric motor starts to ramp up.

The idea on which the invention is based is therefore: De-pending on the motor phases to which the motor brake is attached, these motor phases are switched on early so that the brake can open. The remaining motor phase or the rest of the phases is/are switched on only after a defined waiting time. The period in which the motor is in fact supplied with current, but cannot yet turn on account of the locking by the brake, is therefore significantly shortened in comparison with a conventional operating method in which brake and electric motor are supplied with current at the same time. Accordingly, the loss conduction in the electric motor, and in an optionally present switching device, is reduced in accordance with the non-flowing current in the phases which are not relevant for the brake. The thermal load on the motor windings is thereby significantly reduced. The availability of the motor increases. This means that more starts per unit time, longer continuous operation or shorter cooling-down pauses can be carried out with the electric motor.

The object outlined is also achieved by a computer program product according to the invention. The computer program product is designed such that it can be executed in a separate control unit or in a control unit integrated in a switching device. The computer program product may be able to be stored as software or firmware in a memory and may be designed to be executable by an arithmetic logic unit. As an alternative or in addition, the computer program product may also be formed at least partially as a hard-wired circuit, for example as an ASIC. The computer program product is designed to evaluate received sensor signals and to produce switching commands (switching signals) to switches of phase conductors. According to the invention, the computer program product is designed to implement and carry out at least one embodiment of the outlined method. In this case, the computer program product may combine all the partial functions of the method, that is to say may be of monolithic design. As an alternative, the computer program product may also be designed in a segmented manner and may in each case distribute partial functions to segments which are executed on separate hardware. For example, one part of the method can be carried out in a separate control unit or in a control unit integrated into a switching device, and another part of the method in a higher-level control unit, such as a memory-programmable control device (SPS) or a computer cloud.

The computer program product can be directly loaded into the internal memory of a digital arithmetic logic unit and comprises software code sections by means of which the steps of the method described herein are performed if the product is running on the arithmetic logic unit. The computer program product can be stored on a data carrier, such as, e.g., a USB memory stick, a DVD or a CD-ROM, a flash memory, EEPROM or an SD card. The computer program product can also be present in the form of a signal that can be loaded via a wired or wireless network.

The method is realized for automatic execution, preferably in the form of a computer program. The invention is thus on the one hand also a computer program with program code instructions that can be executed by a computer and on the other hand a storage medium having such a computer program, that is to say a computer program product having program code means.

When method steps or sequences of method steps are described in the following, this relates to actions that take place owing to the computer program or under the control of the computer program insofar as it is not explicitly noted that individual actions are caused by a user of the computer program. At least, each use of the term "automatic" means that the relevant action takes place owing to the computer program or under the control of the computer program.

Instead of a computer program having individual program code instructions, the implementation of the method described here and in the following can also take place in the form of firmware. It is clear to a person skilled in the art that instead of an implementation of a method in software, an implementation in firmware or in firm- and software or in firm- and hardware is also always possible. Therefore, it should be true for the description presented here that the term software or the term computer program also includes other implementation possibilities, namely particularly an implementation in firmware or in firm- and software or in firm- and hardware.

Advantageous configurations and developments of the invention are specified in the dependent claims. In this case, the method according to the invention can also be developed according to the dependent device claims and vice versa.

According to a preferred configuration of the invention, the waiting period is selected to be shorter than the opening period of the brake. This has the advantage that the electric motor remains securely braked until the motor torque starts. This is particularly advantageous in an application of the electric motor for a lifting operation: here, the motor must remain locked securely by the brake until the electric motor can lift a load as a result of the start of the motor torque.

According to a preferred configuration of the invention, the waiting period is selected in such a way that it is at least the same length as the opening period. This has the advantage that the motor is supplied with current only when its locking by the brake has ended. Therefore, in this case, no losses caused by locking by the brake can occur in the motor supplied with current.

According to a preferred configuration of the invention, the subset of the phase conductors to which the brake is connected is identified by the following steps. First, an initial state can be produced in which the two or more phase conductors of the voltage supply are interrupted. Starting from the initial state, in each case one of the phase conductors is switched to current-conducting and, only after a waiting period has elapsed, the electric motor is activated by virtue of the remaining phase conductors also being switched to current-conducting; a ramp-up period between the switching to cur-rent-conducting of the one phase conductor and the reaching of a defined operating state of the electric motor here is determined for each of the phase conductors. If a shorter ramp-up period was measured with one of the phase conductors than with the remaining phase conductors, this phase conductor is identified as the phase conductor connected to the brake. Otherwise, if the same ramp-up period is measured with each phase conductor, starting from the initial state, in each case one phase conductor pair is switched to current-conducting and, only after a waiting period has elapsed, the electric motor is activated by virtue of the remaining phase conductors also being switched to current-conducting; a ramp-up period between the switching to current-conducting of the phase conductor pair and the reaching of a defined operating state of the electric motor here is determined for each of the phase conductor pairs. If a shorter ramp-up period was measured with one of the phase conductor pairs than with the remaining phase conductor pairs, this phase conductor pair is identified as the phase conductor pair connected to the brake. Therefore, the problem of it being frequently unknown to which phase or phases the brake is attached can be solved by measuring the start-up time of the electric motor. To do this, the time from the first switching-on of a phase until the reaching of a defined operating state of the electric motor is measured. The major advantage of the approach is that the commissioning engineer does not have to know to which motor phases the brake is attached.

If the ramp-up period is the same length with each of the phase conductor pairs, the brake is not attached to the voltage supply to the electric motor.

According to a preferred configuration of the invention, in which the brake is attached only to one single phase conductor and one neutral conductor of the voltage supply, this one phase conductor is identified by the following steps: An initial state is produced in which the two or more phase conductors of the voltage supply are interrupted. Starting from the initial state, in each case one of the phase conductors is switched to current-conducting and, only after a waiting period has elapsed, the electric motor is activated by virtue of the remaining phase conductors also being switched to current-conducting. A ramp-up period between the switching to current-conducting of the one phase conductor and the reaching of a defined operating state of the electric motor is determined for each of the phase conductors. That phase conductor with the shortest ramp-up period is identified as the phase conductor connected to the brake. The major advantage of the approach is that the commissioning engineer does not have to know which motor phases the brake is attached to.

According to a preferred configuration of the invention, in which the brake is attached to one phase conductor pair of the voltage supply, this one phase conductor pair is identified by the following steps: An initial state is produced in which the two or more phase conductors of the voltage supply are interrupted. Starting from the initial state, in each case one phase conductor pair is switched to current-conducting and, only after a waiting period has elapsed, the electric motor is activated by virtue of the remaining phase conductors also being switched to current-conducting, wherein a ramp-up period between the switching to current-conducting of the phase conductor pair and the reaching of a defined operating state of the electric motor is determined for each of the phase conductor pairs. That phase conductor pair with the shortest ramp-up period is identified as the phase conductor pair connected to the brake. The major advantage of the approach is that the commissioning engineer does not have to know which motor phases the brake is attached to.

The defined operating state of the electric motor can be a point in time at which the electric motor has accelerated to a specified motor rotational speed. Alternatively, the defined operating state of the electric motor can be a point in time at which there is a reduction in the motor current below/to the rated current.

A preferred configuration of the invention is an electric drive device, having a voltage supply, which has two or more phase conductors for providing a multiphase supply voltage; having a multiphase electric motor, which is connected to the two or more phase conductors; having an electrically actuatable brake for acting upon the electric motor, which brake can be switched between a braking position that locks the electric motor in a voltage-free state and an open position that releases the electric motor in a voltage-supplied state, wherein the brake is connected to only a subset of the two or more phase conductors, and wherein, after the switching from the voltage-free state into the voltage-supplied state, the brake requires a defined opening period until the brake has reached the open position; having switches by means of which each of the two or more phase conductors can be interrupted independently; and having a control unit as described above.

The above-described properties, features and advantages of this invention and the manner in which these are achieved become clearer and more clearly understandable by means of the following description of the exemplary embodiments which are explained in more detail with reference to the drawings. In the drawings, the invention is shown schematically and not to scale in each case.

DETAILED DESCRIPTION OF THE INVENTION

Figure 1:
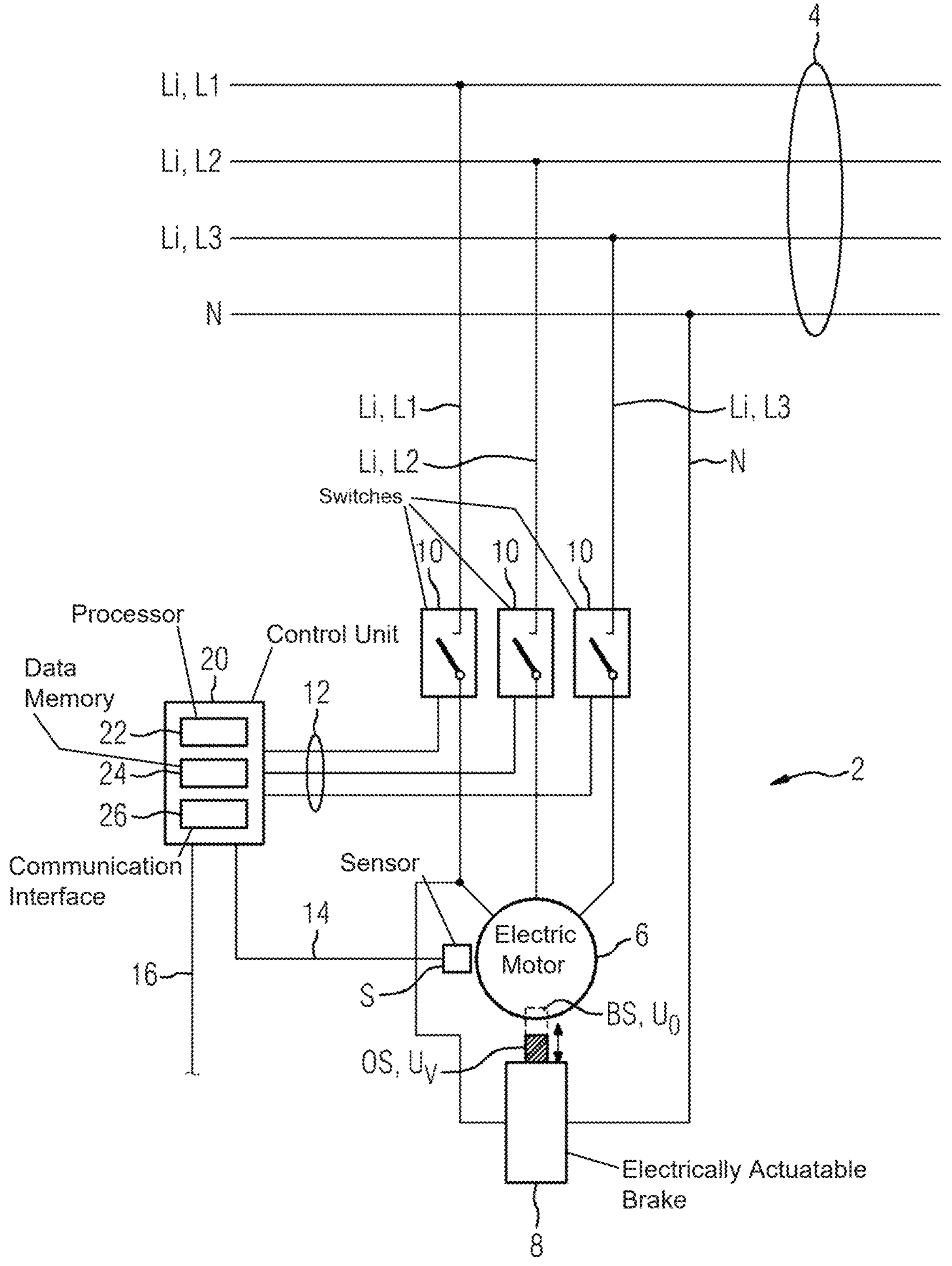
FIG. 1 shows a first configuration of an electric drive device.

FIG. 1 shows an electric drive device 2. The drive device 2 has a voltage supply 4. The voltage supply 4 has three phase conductors L1, L2, L3 for providing a three-phase supply voltage $U_V$. The voltage supply 4 also has a neutral conductor N. The drive device 2 also has a three-phase electric motor 6, which is connected to the three phase conductors L1, L2, L3.

The drive device 2 also has an electrically actuatable brake for acting upon the electric motor 6. The brake 8 can be switched between a braking position BS that occurs in a voltage-free state $U_0$ of the brake 8, in which the brake 8 locks the electric motor 6, and an open position OS that occurs in a voltage-supplied state $U_V$ of the brake 8, in which the brake 8 releases the electric motor 6. Here, the brake 8 is connected to only one single phase conductor L1 of the three phase conductors L1, L2, L3 and to the neutral conductor N. After an operating voltage is applied to the brake 8, that is to say after the switching from the voltage-free state $U_0$ into the voltage-supplied state $U_V$, the brake 8 requires a defined opening period $\Delta t_{OS}$ until the brake 8 has reached the open position OS.

For each of the three phase conductors L1, L2, L3, the drive device 2 has a switch 10 by means of which switches the three phase conductors L1, L2, L3 can be interrupted independently of one another.

The drive device 2 also has a sensor S which can detect measured values relating to the operating state of the electric motor 6.

The drive device 2 has a control unit 20, which has a processor 22, a data memory 24 and a communication interface 26. Control lines, by means of which the control unit 20 can activate the switches 10, run from the control unit 20 to the switches 10. The value of the waiting period $\Delta t_W$ specified by a user and the computer program for performing the operating method are stored in the data memory. For the performance, the computer program is loaded into the processor and processed there. The communication interface 26 provides for an exchange of data between the control unit 20 and communication partners such as the sensor S, which transmits detected measured values via a data line 14 to the control unit 20, the switches 10 which receive switching commands from the control unit 20, and input and output devices, for example a higher-level control unit such as an SPS or an HMI such as a PC, a smartphone or a parameterization device. The depicted communication line 16 is indicated only by way of example as a communication channel having input and output devices; alternatively, wireless communication, for example via NFC or Bluetooth, can also take place.

Figure 2:
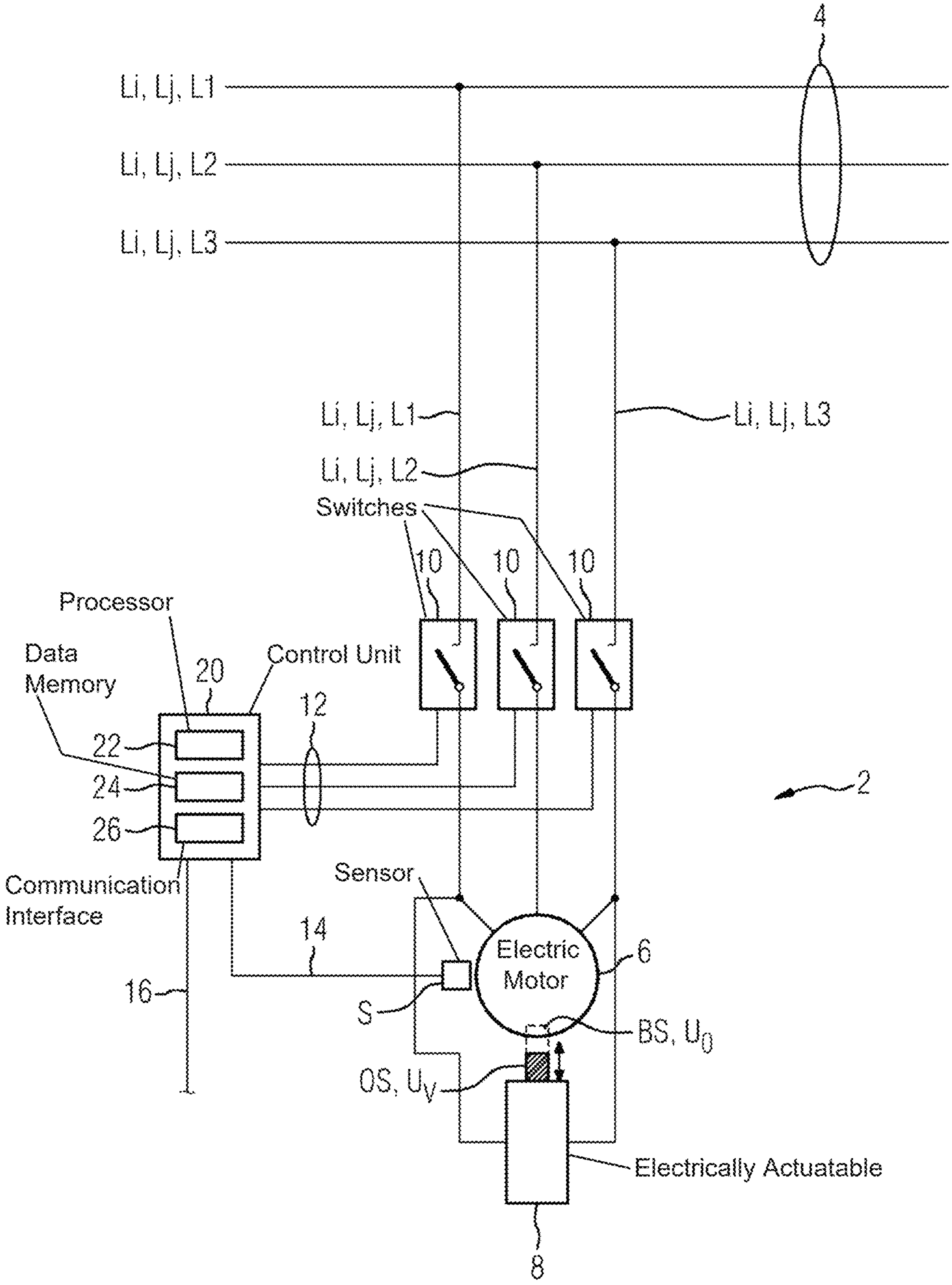
FIG. 2 shows an alternative configuration of an electric drive device.

FIG. 2 shows an alternative configuration of the electric drive device 2 depicted in FIG. 1. The only significant differences from FIG. 1 lie in the fact that the voltage supply 4 shown in FIG. 2 does not have a neutral conductor and that the brake 8 shown in FIG. 2 is connected to two phase conductors L1, L3. One advantage of the configuration shown in FIG. 2 is precisely the omission of the neutral conductor, as a result of which a 3-core cable, which is less expensive than a 4-core cable, is sufficient for supplying voltage to the electric motor 6.

Figure 3:
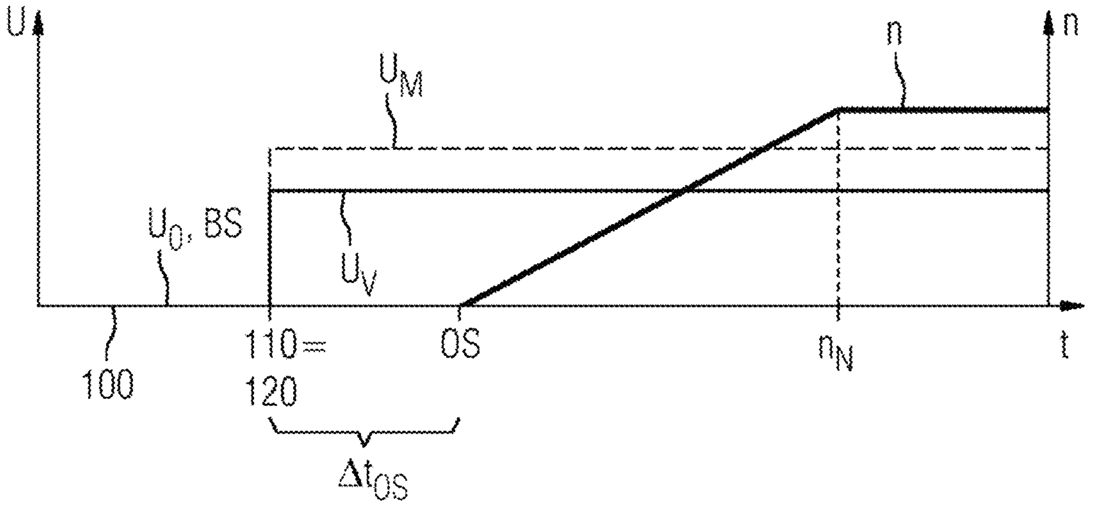
FIG 3 (Prior art)
FIG. 3 shows a conventional operating method.

FIG. 3 shows a U-t and n-t diagram to illustrate a conventional operating method, which is carried out using the drive devices 2 shown in FIGS. 1 and 2. Here, values of voltage U and rotational speed n are plotted across time t. The initial state 100 of the method is a state in which all the phase conductors Li, Lj of the voltage supply 4 which power the electric motor 6 are interrupted in a current-blocking manner by the switches 10. Consequently the brake 8 is in a voltage-free state $U_0$; in this state, the brake 8 adopts a braking position BS, in which it locks the electric motor 6.

At the point in time 110, 120—both points in time 110 and 120 coincide in the conventional operating method—all the phase conductors Li, Lj powering the electric motor 6 are switched to current-conducting as a result of switching commands from the control unit 20 to the switches 10. As a result of the switching to current-conducting of the phase conductors Li, Lj, the brake 8 changes from the voltage-free state $U_0$, in which it adopts the braking position BS that locks the electric motor 6, into a voltage-supplied state $U_V$, in which, after a defined opening period $\Delta t_{OS}$ has elapsed, it moves into an open position OS that releases the electric motor 6. Typical values of the opening period $\Delta t_{OS}$ lie in a range from 50 ms to 150 ms. As a result of the switching to current-conducting of the phase conductors Li, Lj, the electric motor 6 also changes from the voltage-free state, in which it rests without power, into a voltage-supplied state $U_M$, in which voltage is applied to its current windings and the electric motor 6 produces a torque. Between the point in time 110, 120 and the point in time OS at which the brake 6 moves into its open position, the electric motor 6 is locked and generates thermal losses. Only when the brake 6 has moved into its open position OS and releases the electric motor 6 can the ramp-up of the electric motor 6 begin. This is shown in the diagram by the ramp-shaped increasing profile of the rotational speed n up to an operating rotational speed $n_N$, from which the rotational speed n remains constant.

Figure 4:
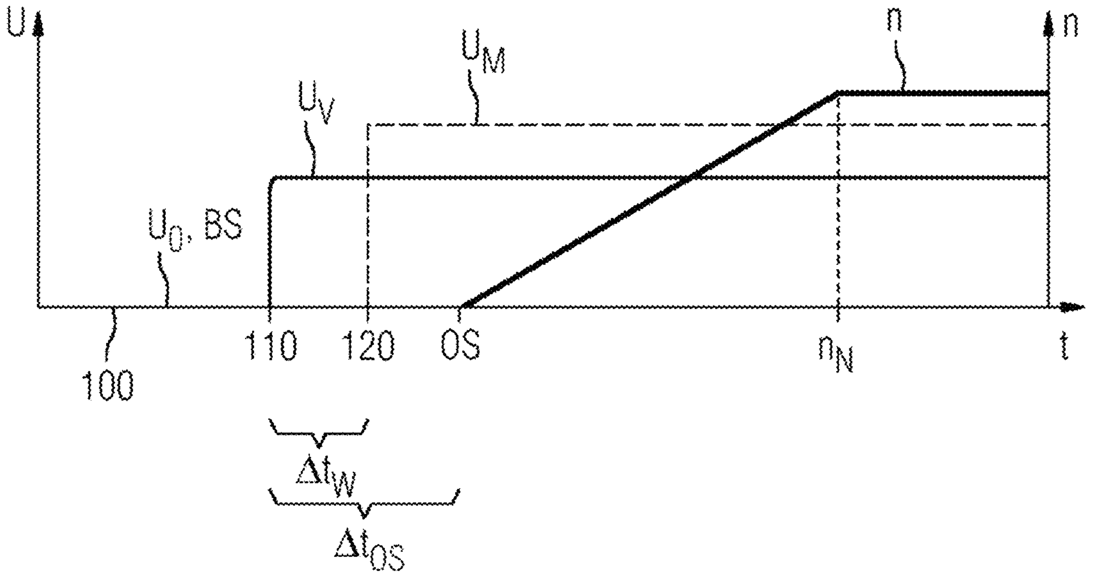
FIG. 4 shows a configuration of the method according to the invention in which the waiting period has been selected to be shorter than the opening period.

In the same way as FIG. 3, FIG. 4 shows a U-t and n-t diagram to illustrate a first configuration of the method according to the invention. In contrast to the conventional operating method, in which the two points in time 110 and 120 coincide, according to the invention the points in time 110 and 120 are separated by a waiting period $\Delta t_W$.

The earlier point in time 110 is the point in time at which only the phase conductors Li powering the brake 8 are switched to current-conducting; after a defined opening period $\Delta t_{OS}$ has elapsed after the point in time 110, the brake 8 moves into an open position OS that releases the electric motor 6.

The later point in time 120 is the point in time at which the rest of the phase conductors Li are also switched to current-conducting. In the first configuration depicted in FIG. 4, the waiting period $\Delta t_W$ is selected to be smaller than the opening period $\Delta t_{OS}$ of the brake 8. During the waiting period $\Delta t_W$, exclusively the brake 8 is supplied with current, whereas the electric motor 6 rests without power in a voltage-free state. The electric motor 6 therefore generates no thermal losses during the waiting period $\Delta t_W$; they occur only in the period between the point in time 120 and the point in time OS.

Figure 5:
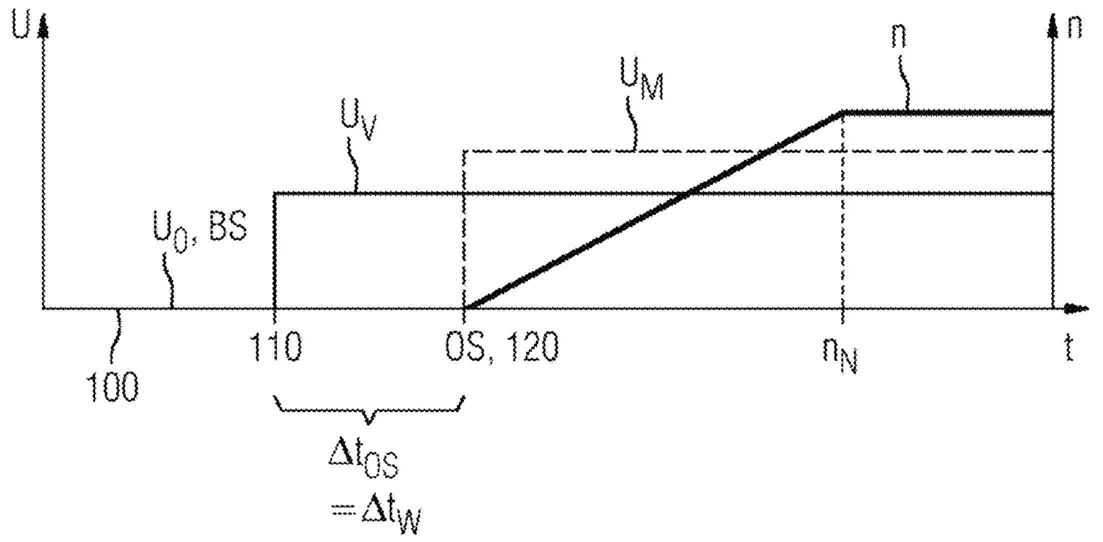
FIG. 5 shows a configuration of the method according to the invention in which the waiting period has been selected to be the same as the opening period.
Figure 6:
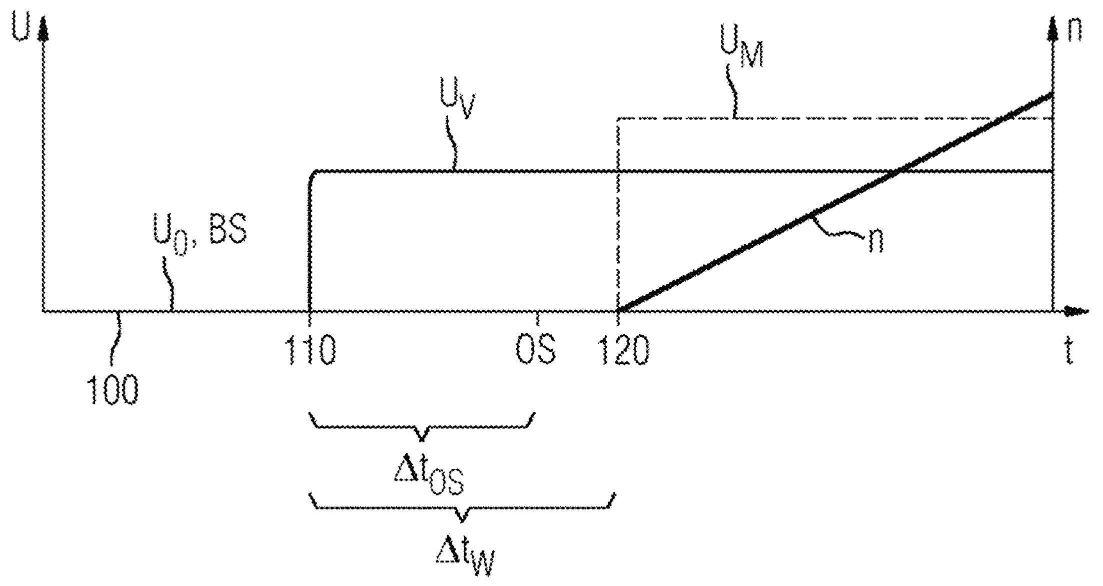
FIG. 6 shows a configuration of the method according to the invention in which the waiting period has been selected to be longer than the opening period.

In the same way as FIGS. 3 and 4, FIG. 5 shows a U-t and n-t diagram to illustrate a second configuration of the method according to the invention. In the second configuration depicted in FIG. 5, the waiting period $\Delta t_W$ is selected to be the same length as the opening period $\Delta t_{OS}$ of the brake 8. Therefore, at the point in time 120 of the supplying of current to the electric motor 6, the brake 8 has already completely released. The thermal losses of the electric motor 6 are therefore equal to zero.

In the same way as FIGS. 3 through 5, FIG. 6 shows a U-t and n-t diagram to illustrate a third configuration of the method according to the invention. In the third configuration depicted in FIG. 6, the waiting period $\Delta t_W$ is selected to be longer than the opening period $\Delta t_{OS}$ of the brake 8. Therefore, at the point in time 120 of the supplying of current to the electric motor 6, the brake 8 has already completely released. The thermal losses of the electric motor 6 are therefore equal to zero.

Figure 7:
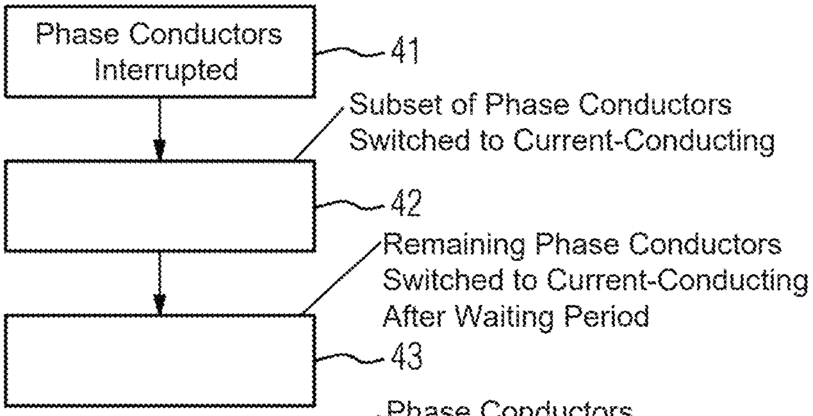
FIG. 7 shows a flowchart of a method according to the invention.

FIG. 7 shows a flowchart of a method according to the invention. The flowchart can be realized in the form of an algorithm in a computer program that runs on the control unit 20. In a first step 41, an initial state 100 is produced in which the two or more phase conductors L1, L2, L3 of the voltage supply 4 are interrupted; for this purpose, the control unit transmits switching commands to the switches 10, which prompt the switches 10 to adopt a switching state in which the phase conductors Li are current-blocking. In a second step 42, starting from the initial state 100, only the subset L1 of the phase conductors to which the brake 8 is connected is switched to current-conducting 110. In a third step 43, after a defined waiting period $\Delta t_W$ has elapsed, the remaining phase conductors L2, L3 are also switched to current-conducting 120, and therefore the electric motor 6 is activated.

Figure 8:
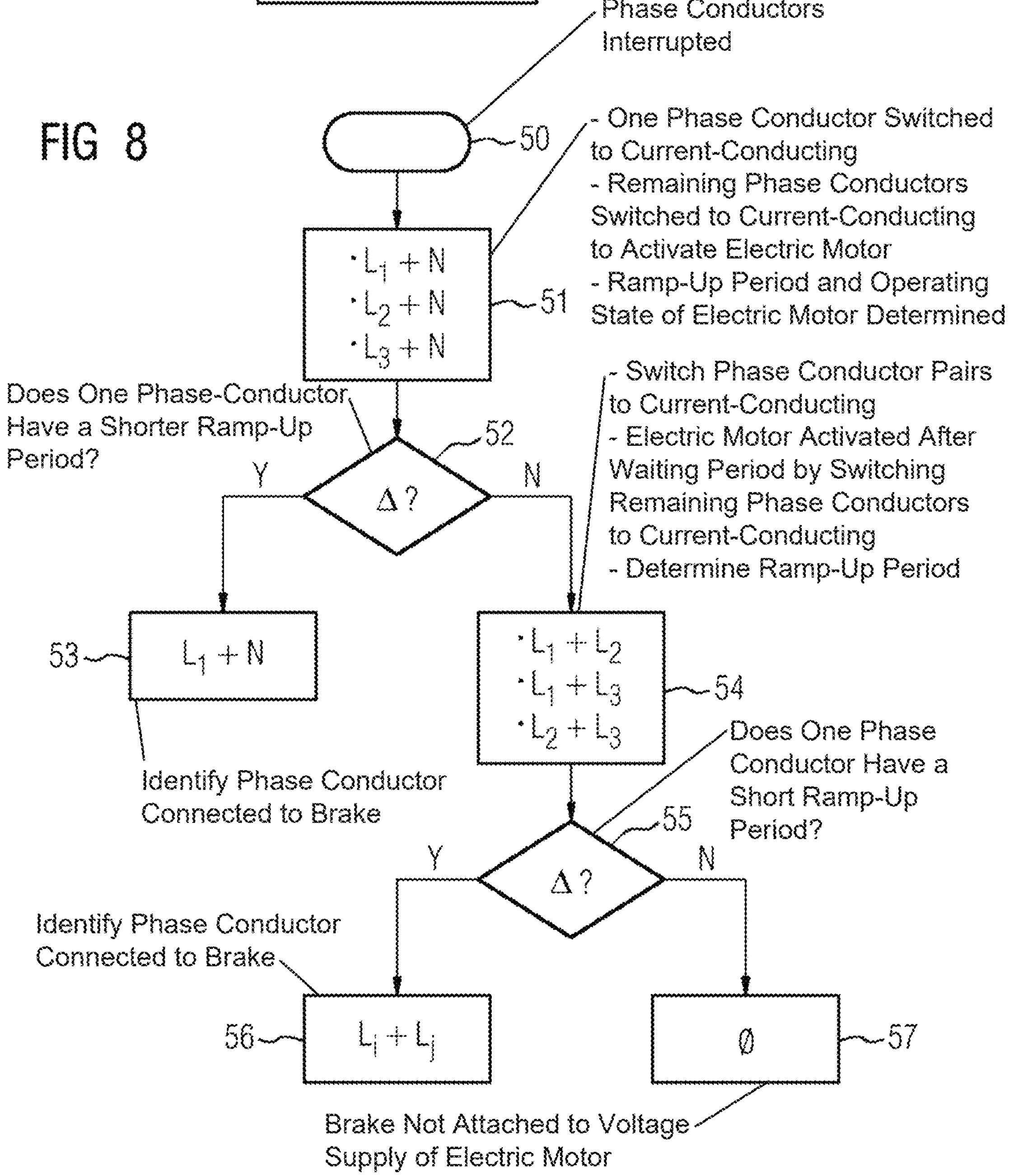
FIG. 8 shows a flowchart of method steps for identifying the subset of the phase conductors to which the brake is connected.

FIG. 8 shows a flowchart of method steps for identifying the subset of the phase conductors to which subset the brake is connected. In a first step 50, an initial state 100 is produced in which the two or more phase conductors L1, L2, L3 of the voltage supply 4 are interrupted.

In a second step 51, starting from the initial state 100, in each case one of the phase conductors Li is switched to current-conducting and, only after a waiting period $\Delta t_W$ has elapsed, the electric motor 6 is activated by virtue of the remaining phase conductors also being switched to current-conducting; a ramp-up period $\Delta t_i$ between the switching to current-conducting 110 of the one phase conductor Li and the reaching of a defined operating state of the electric motor 6 here is determined for each of the phase conductors Li. For this purpose, the sensor S transmits measured values of the rotational speed n of the electric motor 6 to the control unit 20, which calculates the ramp-up period $\Delta t_i$ therefrom. In step 52, the ramp-up times for each of the phase conductors Li are compared. If a shorter ramp-up period $\Delta t_i$ was measured with one of the phase conductors Li than with the remaining phase conductors (Y), in step 53 this phase conductor Li is identified as the phase conductor Li connected to the brake 8. Otherwise (N), if the same ramp-up period $\Delta t_i$ is measured with each phase conductor Li, in step 54 starting from the initial state 100, in each case one phase conductor pair Li, Lj is switched to current-conducting and, only after a waiting period $\Delta t_W$ has elapsed, the electric motor 6 is activated by virtue of the remaining phase conductors also being switched to current-conducting; a ramp-up period $\Delta t_{ij}$ between the switching to current-conducting 110 of the phase conductor pair Li and the reaching of a defined operating state of the electric motor 6 here is determined for each of the phase conductor pairs Li, Lj. For this purpose, the sensor S transmits measured values of the rotational speed n of the electric motor 6 to the control unit 20, which calculates the ramp-up period $\Delta t_{ij}$ therefrom.

In step 55, the ramp-up times $\Delta t_{ij}$ for each of the phase conductor pairs Li, Lj are compared. If a shorter ramp-up period $\Delta t_{ij}$ was measured with one of the phase conductor pairs Li, Lj than with the remaining phase conductor pairs (Y), in step 56 this phase conductor pair Li, Lj is identified as the phase conductor pair Li, Lj connected to the brake 8. Otherwise (N), if the same ramp-up period $\Delta t_{ij}$ was measured with each of the phase conductor pairs Li, Lj, in step 57 it is established that the brake is not attached to the voltage supply to the electric motor; in this case, the control unit 20 produces an indication signal addressed to an operator.

The invention claimed is:

1. A method for operating electric drive devices, the method comprising:

providing an electric drive device including:

a voltage supply having two or more phase conductors for providing a multiphase supply voltage;

a multiphase electric motor connected to the two or more phase conductors;

an electrically actuatable brake for acting upon the electric motor, the brake configured to be switched between a braking position locking the electric motor in a voltage-free state and an open position releasing the electric motor in a voltage-supplied state, the brake being connected to only a subset of the two or more phase conductors, and after switching from the voltage-free state into the voltage-supplied state, the brake requiring a defined opening period until the brake reaching the open position; and switches for independently interrupting each of the two or more phase conductors;

producing an initial state causing the two or more phase conductors of the voltage supply to be interrupted;

starting from the initial state, switching only the subset of the phase conductors connected to the brake to current-conducting; and after a defined waiting period being elapsed, activating the electric motor by also switching remaining phase conductors to current-conducting.

2. The method according to claim 1, which further comprises defining the waiting period to be shorter than the opening period.

3. The method according to claim 1, which further comprises defining the waiting period to be at least equal in length to the opening period.

4. The method according to claim 1, which further comprises identifying the subset of the phase conductors to which the brake is connected as follows:

producing an initial state causing the two or more phase conductors of the voltage supply to be interrupted;

starting from the initial state, switching a respective one of the phase conductors to current-conducting and, only after a waiting period being elapsed, activating the electric motor by also switching remaining phase conductors to current-conducting, and determining a ramp-up period between the switching to current-conducting of the one phase conductor and the reaching of a defined operating state of the electric motor for each of the phase conductors;

upon measuring a shorter ramp-up period with one of the phase conductors than with remaining phase conductors, identifying the one phase conductor as the phase conductor connected to the brake;

otherwise, upon the same ramp-up period being measured with each phase conductor, starting from the initial state, switching one phase conductor pair to current-conducting and, only after a waiting period being elapsed, activating the electric motor by also switching remaining phase conductors to current-conducting, and determining a ramp-up period between the switching to current-conducting of the phase conductor pair and the reaching of a defined operating state of the electric motor for each of the phase conductor pairs;

upon measuring a shorter ramp-up period with one of the phase conductor pairs than with the remaining phase conductor pairs, identifying the one phase conductor pair as the phase conductor pair connected to the brake.

5. The method according to claim 1, which further comprises, upon the brake being attached only to one phase conductor and one neutral conductor of the voltage supply, identifying the one phase conductor as follows:

producing an initial state causing the two or more phase conductors of the voltage supply to be interrupted;

starting from the initial state, switching a respective one of the phase conductors to current-conducting and, only after a waiting period being elapsed, activating the electric motor by also switching remaining phase conductors to current-conducting, and determining a ramp-up period between the switching to current-conducting of the one phase conductor and the reaching of a defined operating state of the electric motor for each of the phase conductors; and identifying a phase conductor with a shortest ramp-up period as the phase conductor connected to the brake.

6. The method according to claim 1, which further comprises, upon the brake being attached to one phase conductor pair of the voltage supply, identifying the one phase conductor pair as follows:

producing an initial state causing the two or more phase conductors of the voltage supply to be interrupted;

starting from the initial state, switching one respective phase conductor pair to current-conducting and, only after a waiting period being elapsed, activating the electric motor by also switching remaining phase conductors to current-conducting, and determining a ramp-up period between the switching to current-conducting of the phase conductor pair and the reaching of a defined operating state of the electric motor for each of the phase conductor pairs; and identifying the phase conductor pair with a shortest ramp-up period as the phase conductor pair connected to the brake.

7. A control unit for operating an electric drive device, the control unit comprising:

means for transmitting a current-blocking switching command to two or more switches configured to be actuated independently of one another and configured to interrupt each respective phase conductor of a voltage supply for providing a multiphase supply voltage to an electric motor, resulting in producing an initial state causing the two or more phase conductors of the voltage supply to be interrupted;

means for transmitting, starting from the initial state, a first current-conducting switching command to at least one of the switches switching a subset of the phase conductors connected to an electrically actuatable brake for acting upon the electric motor, resulting in the brake changing from a voltage-free state causing the brake to adopt a braking position locking the electric motor, into a voltage-supplied state causing the brake, after a defined opening period being elapsed, to move into an open position releasing the electric motor; and means for transmitting, after a defined waiting period being elapsed after the first current-conducting switching command, a second current-conducting switching command to the switch or switches, switching remaining phase conductors, resulting in the remaining phase conductors also being switched to current-conducting and the electric motor being activated.

8. An electric drive device, comprising:

a voltage supply having two or more phase conductors for providing a multiphase supply voltage;

a multiphase electric motor connected to said two or more phase conductors;

an electrically actuatable brake for acting upon said electric motor, said brake configured to be switched between a braking position locking said electric motor in a voltage-free state and an open position releasing said electric motor in a voltage-supplied state, said brake being connected to only a subset of said two or more phase conductors, and after switching from said voltage-free state into said voltage-supplied state, said brake requiring a defined opening period until said brake reaching said open position;

switches configured to independently interrupt each respective one of said two or more phase conductors; and a control unit according to claim 7.

9. A computer program product, comprising commands causing the control unit according to claim 7 to perform method steps for operating an electric drive device including:

a voltage supply having two or more phase conductors for providing a multiphase supply voltage;

a multiphase electric motor connected to the two or more phase conductors;

an electrically actuatable brake for acting upon the electric motor, the brake configured to be switched between a braking position locking the electric motor in a voltage-free state and an open position releasing the electric motor in a voltage-supplied state, the brake being connected to only a subset of the two or more phase conductors, and after switching from the voltage-free state into the voltage-supplied state, the brake requiring a defined opening period until the brake reaching the open position; and switches for independently interrupting each of the two or more phase conductors;

the method steps comprising:

producing an initial state causing the two or more phase conductors of the voltage supply to be interrupted;

starting from the initial state, switching only the subset of the phase conductors connected to the brake to current-conducting; and after a defined waiting period being elapsed, activating the electric motor by also switching remaining phase conductors to current-conducting.

10. A non-transitory computer-readable medium having a computer program product according to claim 9 stored thereon.

* * * * *